United States Patent
Penkov et al.

(10) Patent No.: US 10,199,961 B2
(45) Date of Patent: Feb. 5, 2019

(54) CONTROL METHOD FOR BREAKING AN ELECTRIC MOTOR

(71) Applicant: Schneider Electric Industries SAS, Rueil Malmaison (FR)

(72) Inventors: Delcho Penkov, Saint Martin d'Heres (FR); Grace Gandanegara, Saint Martin le Vinoux (FR); Christophe Durand, Grenoble (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 0 days.

(21) Appl. No.: 15/669,381

(22) Filed: Aug. 4, 2017

(65) Prior Publication Data
US 2018/0062545 A1 Mar. 1, 2018

(30) Foreign Application Priority Data
Aug. 24, 2016 (FR) ..................................... 16 57889

(51) Int. Cl.
*H02P 3/18* (2006.01)
(52) U.S. Cl.
CPC ..................................... *H02P 3/18* (2013.01)
(58) Field of Classification Search
CPC .................. H02P 3/18; H02P 3/00; B60L 7/00
(Continued)

(56) References Cited

U.S. PATENT DOCUMENTS 5,008,608 A * 4/1991 Unsworth .............. H02P 27/02
318/729
6,380,708 B1 4/2002 Gritter et al.
(Continued)

FOREIGN PATENT DOCUMENTS

EP 2 937 988 A2 10/2015
WO WO 01/89073 A2 11/2001
WO WO 2009009232 A2 * 1/2009 ........... G01R 31/346

OTHER PUBLICATIONS

French Preliminary Search Report dated Jun. 8, 2017 in French Application 16 57869 filed on Aug. 24, 2016 (with English Translation of Categories of Cited Documents).
(Continued)

*Primary Examiner* — Jorge L Carrasquillo
(74) *Attorney, Agent, or Firm* — Oblon, McClelland, Maier & Neustadt, L.L.P.

(57) ABSTRACT

A control method brakes an electric motor connected to a voltage source. The method involves, in each cycle, the supply of current to the motor, with a delay $t_{ret}$, at an angle α. The method includes a sequence such that, for every n cycle, the following steps are executed: a) determining the value of a variation in the resistance of the motor during the preceding n cycles of the voltage, b) comparing the value of the variation in resistance with a threshold resistance value $R_t$, c) increasing in the delay $t_{ret}$ if the value of the variation in resistance is lower than the threshold resistance value. The increase in the delay $t_{ret}$ is executed in accordance with a gamma command, where the angle α lies between 50° and 80°.

18 Claims, 5 Drawing Sheets

(58) Field of Classification Search
USPC .. 318/365, 141, 142, 400.1, 400.13, 400.09, 318/400.06, 362, 87, 452
See application file for complete search history.

(56) References Cited

U.S. PATENT DOCUMENTS

| | | | |
|---|---|---|---|
| 2015/0108926 A1* | 4/2015 | Wiszniewski | H02P 3/18 318/245 |
| 2015/0108927 A1* | 4/2015 | Wiszniewski | H02P 25/14 318/245 |
| 2015/0311828 A1* | 10/2015 | Durand | H02P 1/28 318/778 |

OTHER PUBLICATIONS

Kevin Lee et al. "Influence of Deep Bar Effect on Induction Machine Modeling with Gamma-Controlled Soft Starters," IEEE, vol. 3, Applied Power Electronics Conference and Exposition, 978-0-7803-8975-5, Mar. 2005, pp. 7.

* cited by examiner

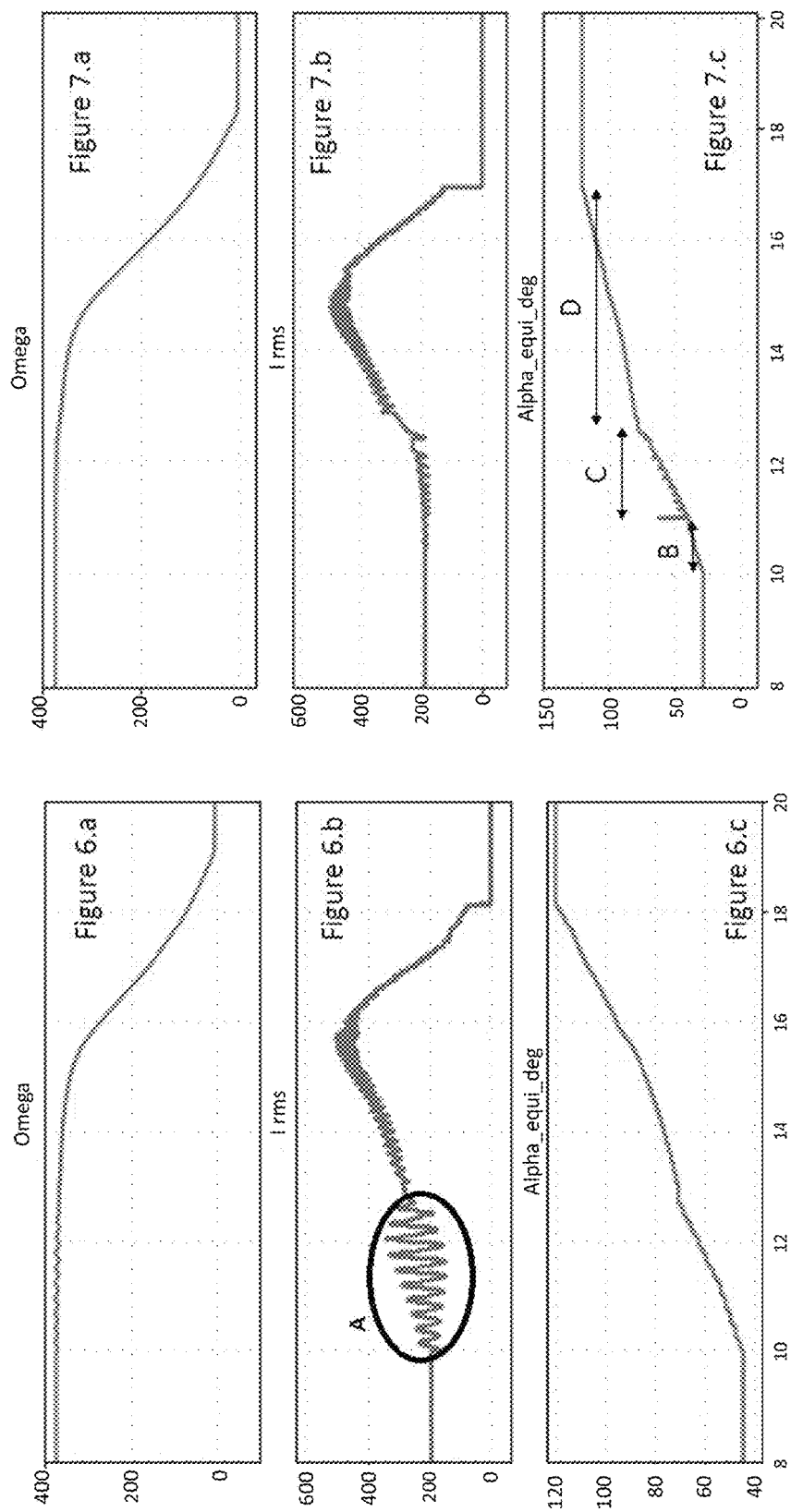

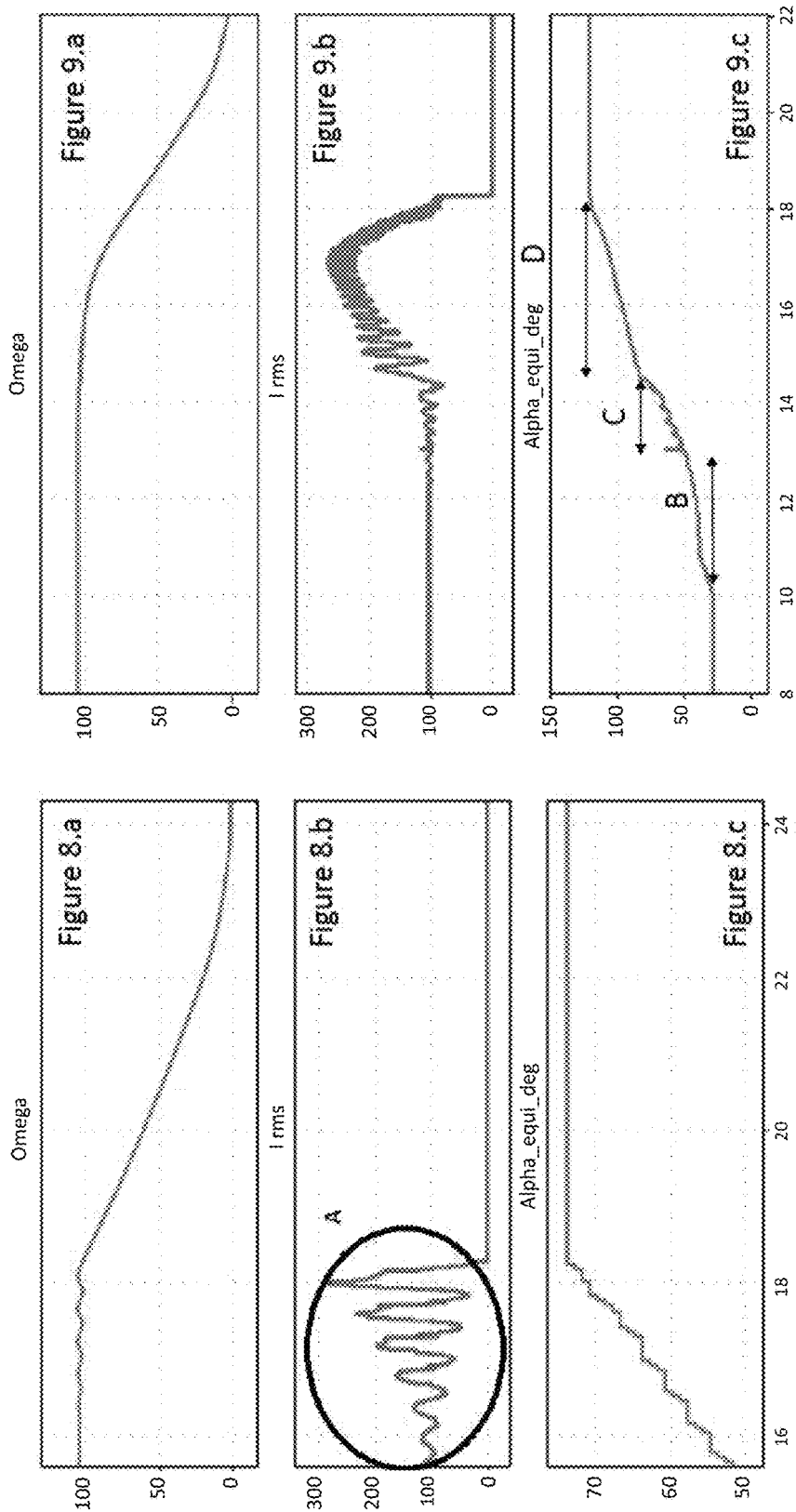

CONTROL METHOD FOR BREAKING AN ELECTRIC MOTOR

TECHNICAL FIELD

The invention relates to a control method for braking an electric motor.

PRIOR ART

During the start-up and the shutdown of a motor (of the synchronous or asynchronous type) which is supplied by an alternating voltage source $V_{AC}$, stray phenomena, such as transient currents and voltages, can occur. In order to limit the level of stress on the motor, and the disturbance of other loads connected to the same voltage source, it is essential that these stray phenomena are limited.

In this regard, a speed variator can assume this function for the limitation of stray phenomena in a highly effective manner, during both the start-up and the shutdown of the motor, and can be employed for the fine control of the speed of rotation of the motor.

However, this solution is not entirely satisfactory.

In practice, the exceptionally high cost of a speed variator limits the application thereof. Moreover, a speed variator is cumbersome, and may represent both a substantial weight and a substantial additional cost.

In order to rectify these disadvantages, document [1], cited at the end of the description, proposes an alternative device which is described, in English terminology, as a "soft-starter". A device of this type is generally a controlled switch, comprising two thyristors connected head-to-tail in parallel (FIG. 1), arranged between the alternating voltage source and the motor.

Thyristors connected head-to-tail are suitable for the connection of the motor to phase, respectively during the positive and negative half-cycles of the phase voltage. In each half-cycle of the current flowing in the thyristor, the current is cancelled out naturally below a threshold which is dependent upon the thyristor, but is close to zero. The gate of the corresponding thyristor is then connected to supply, in order to restore the conduction of current. This results in a variable duration of the interruption to the current supplying the motor and, consequently, a reduced current supply to the motor. The command for the restoration of conduction of the thyristor is executed with a delay in time or in electrical degrees (more specifically, a delay in supply), which is counted in relation to a reference value for the voltage or current.

The adjustment of this delay in the power supply to the gate can either be executed in accordance with an alpha command ($\alpha$), i.e. the gate is supplied with a delay corresponding to an angle $\alpha$, following the zero-crossing of the corresponding phase voltage, or in accordance with a gamma command ($\gamma$), i.e. the gate is supplied with a delay corresponding to an angle gamma $\gamma$, following the zero-crossing of the corresponding phase current. Adjustments to the delay in relation to variables derived from a specific processing function, such as the current derivative, are also conceivable. Whether in the case of the angle alpha $\alpha$, or the angle gamma $\gamma$, these two delays, which correspond respectively to times of $\alpha T/2\pi$ and $\gamma T/2\pi$, where T is the cycle time of the supply voltage, correspond to a delay $t_{ret}$ in the current supply of the motor.

The patent application [2] of the applicant (cited at the end of the description) describes a method for the start-up of a motor which is executed by a controlled switch comprising at least two thyristors. The method for the start-up of the motor comprises a phase for the verification of the change in state of the motor, which affects the acceleration of said motor after each reduction in the delay of the power supply to the gate, in accordance with either the alpha command or the gamma command.

A control method for braking can assume the same principles described in the patent application [2], and include the consideration of a sequential increase in the delay, in accordance with one or the other of the alpha and gamma commands, in combination with a step for the verification of the change in state of the motor.

However, a control method for braking of this type cannot be satisfactory.

In practice, control of the increase in the delay in accordance with an alpha command generates oscillations in the current flowing in the motor, which can result in mechanical stresses and malfunctions in the motor.

Moreover, control of the increase in the delay in accordance with a gamma command is associated with a lack of precision in the determination of the zero-crossing of the current.

One object of the present invention is therefore the disclosure of a control method for braking which permits the reduction of oscillations in the current flowing in the motor, whilst ensuring the accurate control of the deceleration of the motor.

PRESENTATION OF THE INVENTION

The object of the invention, at least in part, is fulfilled by a control method for braking an electric motor which is connected to an alternating voltage source $V_{AC}$ with a cycle time T, wherein the method involves, in each cycle of the alternating voltage $V_{AC}$, the supply of current to the motor, by the firing of a controlled switch, with a delay $t_{ret}$, at a firing angle alpha $\alpha$, wherein said angle $\alpha$ is measured in relation to the zero-crossing of the alternating voltage $V_{AC}$, and wherein the method comprises a braking sequence in which, for every n cycle of the alternating voltage $V_{AC}$, the following steps are executed:

a) determination of the value of a variation $\Delta Rr$ in the electrical resistance of the motor during the preceding n cycles of the alternating voltage $V_{AC}$, b) comparison of the value of the variation in the electrical resistance of the motor, determined in step a), with a threshold resistance value $R_t$, c) increase in the delay $t_{ret}$ if the value of the variation in the resistance of the motor is lower than the threshold resistance value, wherein the increase in the delay $t_{ret}$ is executed in accordance with a gamma command, when the angle alpha $\alpha$ falls within a given range of values, and in accordance with an alpha command in other cases.

According to one form of embodiment, the given range of values lies over 30°, between 45° and 80°.

According to one form of embodiment, the given range of values lies between 50° and 80°.

According to one form of embodiment, the given range of values lies between 45° and 75°.

According to one form of embodiment, the method commences with a step for the initialization of the delay $t_{ret}$ at a value $t_{retinit}$, which is appropriate for the establishment of full-wave operation on the controlled switch, wherein $t_{retinit}$ is advantageously adjusted in order to trip the closing of the controlled switch immediately upon the zero-crossing of a current flowing in the controlled switch.

According to one form of embodiment, in step c), the increase in the delay $t_{ret}$ is executed by an increment $\Delta t$, such that the angle defined by the relationship $2\pi\Delta t/T$ is less than 5°, preferably less than 3°, and more preferably still lies between 0.5 and 2°.

According to one form of embodiment, once the delay $t_{ret}$ is increased in step c), a waiting time $t_{buf}$ is imposed prior to the repetition of the braking sequence, wherein the waiting time $t_{buf}$ is preferably a whole multiple p of the cycle time T of the alternating voltage $V_{AC}$, or more preferably still p is equal to 2.

According to one form of embodiment, step a) is a step for the determination of a relative temporal variation in the resistance of the motor $$\frac{\frac{\Delta R}{R}(t)}{\Delta t},$$

wherein said relative temporal variation is preferably calculated by the following equation:

$$\frac{\frac{\Delta R}{R}(t)}{\Delta t} = \frac{\frac{R(t-nT) - R(t)}{R(t-nT)}}{nT}$$

where R(t) is a value relative to the resistance of the motor determined at a time t.

According to one form of embodiment, once the firing angle alpha a exceeds 120° and/or the current flowing in the motor is lower than a predefined current value, the control method for braking the motor is terminated and, advantageously, the controlled switch is open.

According to one form of embodiment, the threshold resistance value $R_t$ lies between 0.05 and 0.5, preferably between 0.1 and 0.3, and more preferably still between 0.15 and 0.25.

According to one form of embodiment, the controlled switch comprises two thyristors, connected head-to-tail in parallel.

The invention also relates to a computer program product comprising program code instructions for the execution, where said program is run on a computer, of steps for the determination of a variation in a resistance of the motor, the comparison of said variation with a threshold resistance value $R_t$, the selection of a command for the increase of the delay $t_{ret}$, selected from one or the other of the alpha and gamma commands in accordance with a selection criterion, and an increase in the delay $t_{ret}$ if the value of the variation in the resistance of the motor is lower than a threshold value.

According to one form of embodiment, the selection criterion involves the selection of a gamma command when the angle alpha a lies between 50° and 80°.

BRIEF DESCRIPTION OF THE DRAWINGS

Further characteristics and advantages will become apparent from the following description of forms of embodiment of the control method for braking a motor according to the invention, which are provided by way of non-limiting examples, with reference to the attached drawings, in which:

FIGS. 6a to 6c represent, during the execution of a method for braking a motor which powers a centrifugal compressor, which is known from the prior art, the movement over time (on the horizontal axes) of the motor speed (FIG. 6.a), the current supply to the motor (FIG. 6.b), and the angle α (FIG. 6.c), FIGS. 7a to 7c represent, during the execution of the method for braking a motor which powers a centrifugal compressor, according to the invention, the movement over time (on the horizontal axes) of the motor speed (FIG. 7.a), the current supply to the motor (FIG. 7.b), and the angle α (FIG. 7.c), FIGS. 8a to 8c represent, during the execution of a method for braking a motor which powers a conveyor, which is known from the prior art, the movement over time (on the horizontal axes) of the motor speed (FIG. 8.a), the current supply to the motor (FIG. 8.b), and the angle α (FIG. 8.c), FIGS. 9a to 9c represent, during the execution of the method for braking a motor which powers a conveyor, according to the invention, the movement over time (on the horizontal axes) of the motor speed (FIG. 9.a), the current supply to the motor (FIG. 9.b), and the angle α (FIG. 9.c).

DETAILED DESCRIPTION OF SPECIFIC FORMS OF EMBODIMENT

Figure 2:
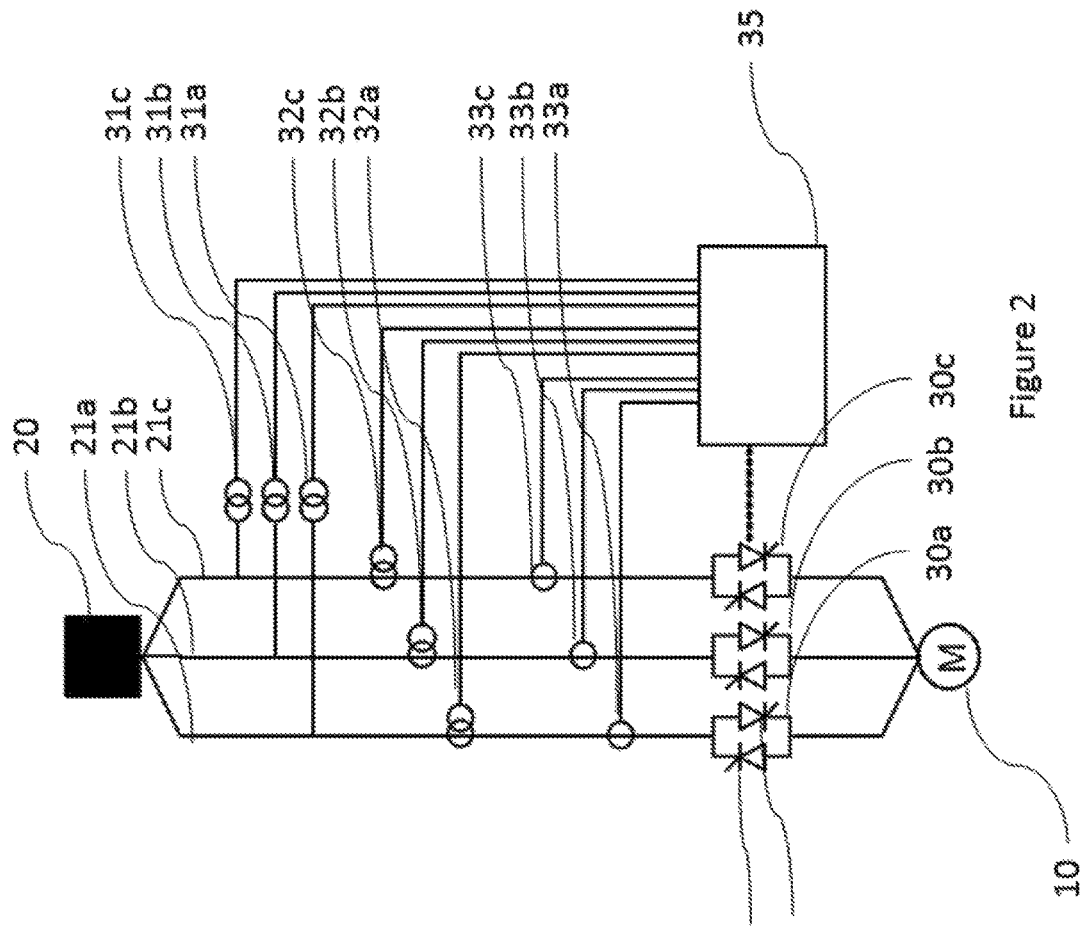
FIG. 2 shows a schematic representation of a circuit comprising a motor which is supplied by an alternating voltage source via a controlled switch, which is controlled by the processing and control unit according to the invention.
Figure 1:
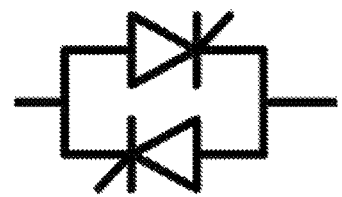
FIG. 1 shows a schematic representation of a controlled switch, comprising two thyristors connected head-to-tail in parallel.

FIG. 2 illustrates a device 1 comprising an electric motor 10, an alternating voltage source $V_{AC}$ 20, which is designed to supply the motor 10 via a controlled switch 30a, 30b, 30c. The device 1 moreover comprises a processing and control unit 35 which is designed to control the switching of the controlled switch 30a, 30b, 30c from a blocked state (switch open) to a conductive state (switch closed).

The source 20 can be, for example, a three-phase source which supplies the motor with current by means of its three phases 21a, 21b, 21c.

Each phase 21a, 21b, 21c is connected to the motor 10 via a controlled switch 30a, 30b, 30c.

More specifically, the controlled switch 30a, 30b, 30c is designed to connect or disconnect the motor 10 from the phase 21a, 21b, 21c.

Each controlled switch 30a, 30b, 30c can comprise two thyristors connected head-to-tail in parallel. Accordingly, the thyristors 301a, 301b on a phase 21a, 21b, 21c of the source 20 are designed to connect the motor to said phase 21a, 21b, 21c during the positive and negative current half-cycle of the latter respectively.

The device 1 also comprises means for measuring the supply voltage 31a, 31b, 31c (the voltage on the three phases 21a, 21b, 21c of the source 10). The measuring means are, for example, voltmeters.

The device 1 also comprises means for measuring the supply current 32a, 32b, 32c (the current on the three phases 21a, 21b, 21c of the source 10). The measuring means are, for example, ammeters.

The device 1 comprises detection means 33a, 33b, 33c for the time of the zero-crossing of the current. The detection means 33a, 33b, 33c can be means for measuring the current derivative, for example Rogowski sensors.

The processing and control unit 35 is configured for the individual supply of each of the gates of the thyristors 301a, 301b, and thus for the control of the closing of the latter, in the event of the supply thereof with an appropriate voltage half-cycle of the corresponding phase.

Each controlled switch 30a, 30b, 30c thus constitutes a means for the delay of the supply of the motor 10, in order to delay the current supply to the motor 10.

The supply voltage measuring means 31a, 31b, 31c are designed to permit, on each of the phases 21a, 21b, 21c of the voltage source 20, a voltage measurement up-circuit of the corresponding switch 30a, 30b, 30c.

The supply current measuring means 32a, 32b. 32c are designed to permit, on each of the phases 21a, 21b, 21c of the voltage source 20, a current measurement up-circuit of the corresponding switch 30a, 30b, 30c.

The detection means 33a, 33b, 33c are designed to permit, on each of the phases 21a, 21b, 21c of the voltage source 20, the detection of the time of the zero-crossing of the current, or the current derivative across the motor 10.

The processing and control unit 35 is configured, from the values measured by the current measuring means 32a, 32b, 32c and by the voltage measuring means 31a, 31b, 31c, to determine a resistance of the assembly comprised of the controlled switch(es), the motor and the cables (connecting the "soft-starter" to the motor), described as the switch/motor/cable resistance. The determination of this switch/motor resistance is preferably executed by a calculation of a direct component, which constitutes a value of the symmetrical components. A value of this type has the advantage in that it supplies a variable which reflects the state of the motor in each of the three phases. A calculation of this type can be obtained by the execution of the following steps:

- determination, from the current measuring means 32a, 32b, 32c and the voltage measuring means 31a, 31b, 31c, of fundamental values, at the network frequency, for the up-circuit or down-circuit current and the up-circuit voltage of the controlled switches 30a, 30b, 30c,
- calculation, from these fundamental values, of direct current and voltage components,
- division of the direct voltage component by the direct current component, in order to obtain the direct resistance.

This calculation can be executed once per supply voltage cycle.

Figure 3:
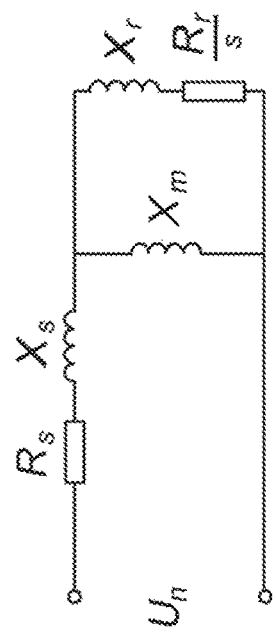
FIG. 3 shows a schematic representation of an equivalent circuit of an asynchronous motor, wherein Rs and Xs are the resistance and the reactance of the motor stator respectively, Rr/s and Xr are the resistance and the reactance of the rotor respectively, and "s" is the motor slip.

As the resistance of the switches 30a, 30b, 30c does not vary as a function of the speed of rotation of the motor 10, and the resistance of the thyristors in the conductive state is low, and therefore negligible, any variation in the switch/motor resistance therefore corresponds principally to a variation in the resistance of the motor. FIG. 3 thus illustrates an equivalent diagram which refers to the stator of a motor 10 of the asynchronous type, for which the invention is particularly advantageous. It can be seen that the resistive components of such a motor 10 deliver two contributions, namely a static resistance Rs (stator resistance) and a variable resistance $$\frac{Rr}{s}$$

(rotor resistance) which is inversely proportional to the motor slip s.

During a shutdown phase of the motor 10, the motor slip "s" moves from a value of typically less than 1%, corresponding to the motor rotating at the rated speed, to a value of 1, with the motor 10 in the shutdown state. It therefore proceeds that, during the braking of the motor 10, the value of the rotor resistance $$\frac{Rr}{s}$$

is divided by close to 100, and it is possible to determine, from the variation in the resistance of the motor 10, if there is a variation, and more specifically a reduction, in the speed of rotation.

The processing and control unit 35 is thus configured to employ such a measurement of the variation in the resistance in the motor in order to determine a time or a delay $t_{ret}$ with effect from which the controlled switch 30a, 30b, 30c receives the instruction to switch to the conductive state.

Figure 4:
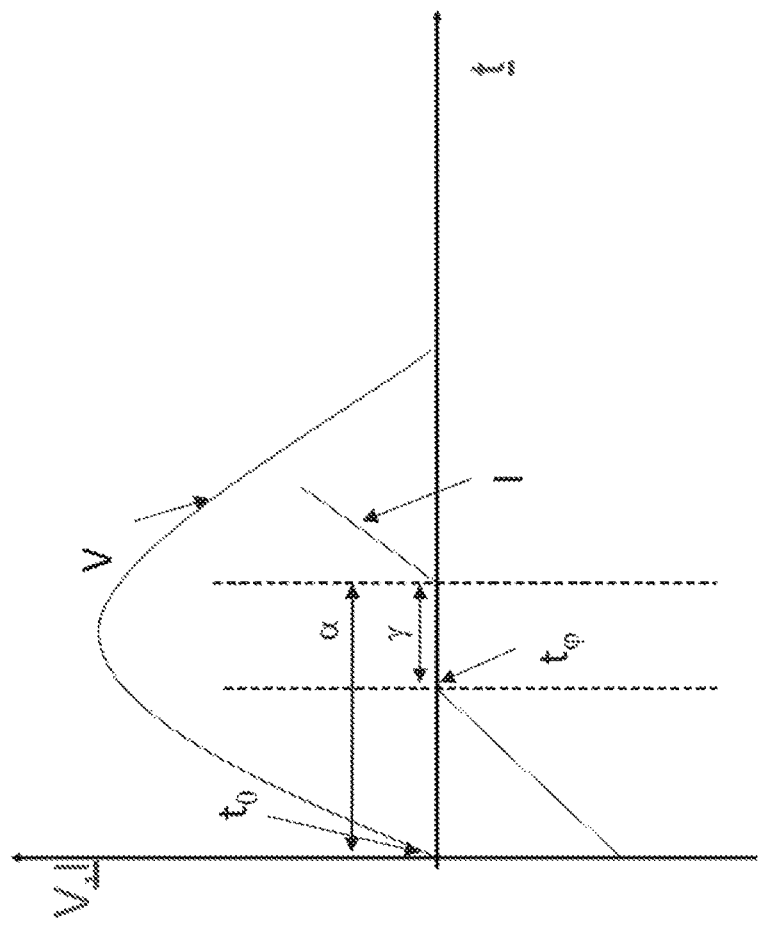
FIG. 4 illustrates the control principle for the closing of the controlled switch by the processing and control unit according to the invention.

FIG. 4 illustrates the control principle for the closing of the controlled switch 30a, 30b, 30c by the processing and control unit 35. The processing and control unit 35 can, in the first instance, detect the zero-crossing on the rising ramp of the supply voltage.

By the term zero-crossing on the rising ramp, we understand a zero-crossing to positive values of the voltage on at least one phase of the power supply source. The processing and control unit 35 also detects zero-crossings on the descending ramp of at least one phase of the power supply source. By the term zero-crossing on the descending ramp, we understand a zero-crossing to negative values of the voltage on at least one phase of the power supply source. Moreover, the expression "zero-crossing" can equally well signify "zero-crossing on the rising ramp" as "zero-crossing on the descending ramp". Finally, the expression "zero-crossing" relates to a given cycle time T of the alternating voltage on the phase of the power supply source considered. Zero-crossings of the voltage on at least one phase are detected by techniques which are known to a person skilled in the art, and will not be described in any greater detail in the remainder of the present description.

Detection of the zero-crossing may involve the voltage measuring means 31a, 31b, 31c. The time of the zero-crossing of the supply voltage is designated as $t_0$. The processing and control unit 35 can also detect the time $t_\varphi$ with effect from which the current passes through zero in the controlled switch 30a, 30b, 30c (whereby it is understood that the current only flows through a single thyristor at any given time). The time $t_\varphi$ is naturally included in the cycle considered. The time $t_\varphi$ is measured in relation to the time $t_0$ of the zero-crossing of the voltage (in the phase considered). Conversely to the time $t_0$, which is repeated periodically, the time $t_\varphi$ can vary from one cycle to another.

Once the current flowing in a thyristor is cancelled out, said thyristor assumes a blocking state. The thyristor can only resume a conductive (closed) state if it receives a firing instruction, with a delay $t_{ret}$ (closing instruction), on its gate during a positive half-cycle of the voltage across its terminals. The firing instruction may be transmitted by the processing and control unit 35.

The delay $t_{ret}$ may be defined in relation to the time of the zero-crossing $t_0$ of the voltage. The temporal delay between the zero-crossing of the voltage and the firing time, $\Delta t_{am\alpha} = t_{ret} - t_0$, defines an angle, described as angle alpha $\alpha$ (in degrees "°"), and confirming the relationship $\alpha = (\Delta t_{am} * 360)/T$. Where it is defined in relation to the time of the zero-crossing $t_0$ of the voltage, reference is made to the control of the delay $t_{red}$ by an alpha command.

In an equivalent manner, the delay $t_{ret}$ can be defined in relation to the time of the zero-crossing $t_\varphi$ of the current. The temporal delay between the zero-crossing of the current and the firing time, $\Delta t_{am\gamma} = t_{ret} - t_\varphi$, defines an angle, described as angle gamma $\gamma$ (in degrees "°"), and confirming the relationship $\gamma = (\Delta t_{am\gamma} * 360)T$. Where it is defined in relation to the time of the zero-crossing $t_\varphi$ of the current, reference is made to the control of the delay $t_{red}$ by a gamma command.

Again in an equivalent manner, the delay $t_{ret}$ can be defined in relation to the time of the first zero-crossing $t_\delta$ of the current derivative. The temporal delay between the first zero-crossing of the current derivative and the firing time, $\Delta t_{am\delta\gamma} = t_{ret} - t_\delta$, defines an angle, described as angle $\delta_\gamma$ (in degrees "°"), and confirming the relationship $\delta_\gamma = (\Delta t_{am\delta\gamma} * 360)/T$. Where it is defined in relation to the time of the first zero-crossing $t_\delta$ of the current derivative, reference is made to the control of the delay $t_{ret}$ by a delta-gamma command.

Through the description of the present invention, we have combined the expressions "gamma command" and "delta-gamma command", which are designated by the term gamma command. It is therefore understood that, where a gamma command is executed, it is defined either in relation to the zero-crossing of the current, or in relation to the first zero-crossing of the current derivative.

Moreover, by the terms detection of the zero-crossing of the current or of the first zero-crossing of the current, current is understood as the line current or, in other words, the current supplying the motor 10.

The processing and control unit 35 can control, in each cycle of the alternating voltage $V_{AC}$, and for each thyristor, the delay $t_{ret}$ on said thyristors, in order to adjust the current supply to the motor 10.

Accordingly, at every n preceding cycle of the alternating voltage $V_{AC}$ (where n is a positive whole number), the firing of the thyristor can be adjusted in order to progressively reduce the current supply to the motor 10.

The progressive adjustment of the firing of the thyristor can incorporate an increase in the delay $t_{ret}$ at every n cycle of the alternating voltage $V_{AC}$.

Figure 5:
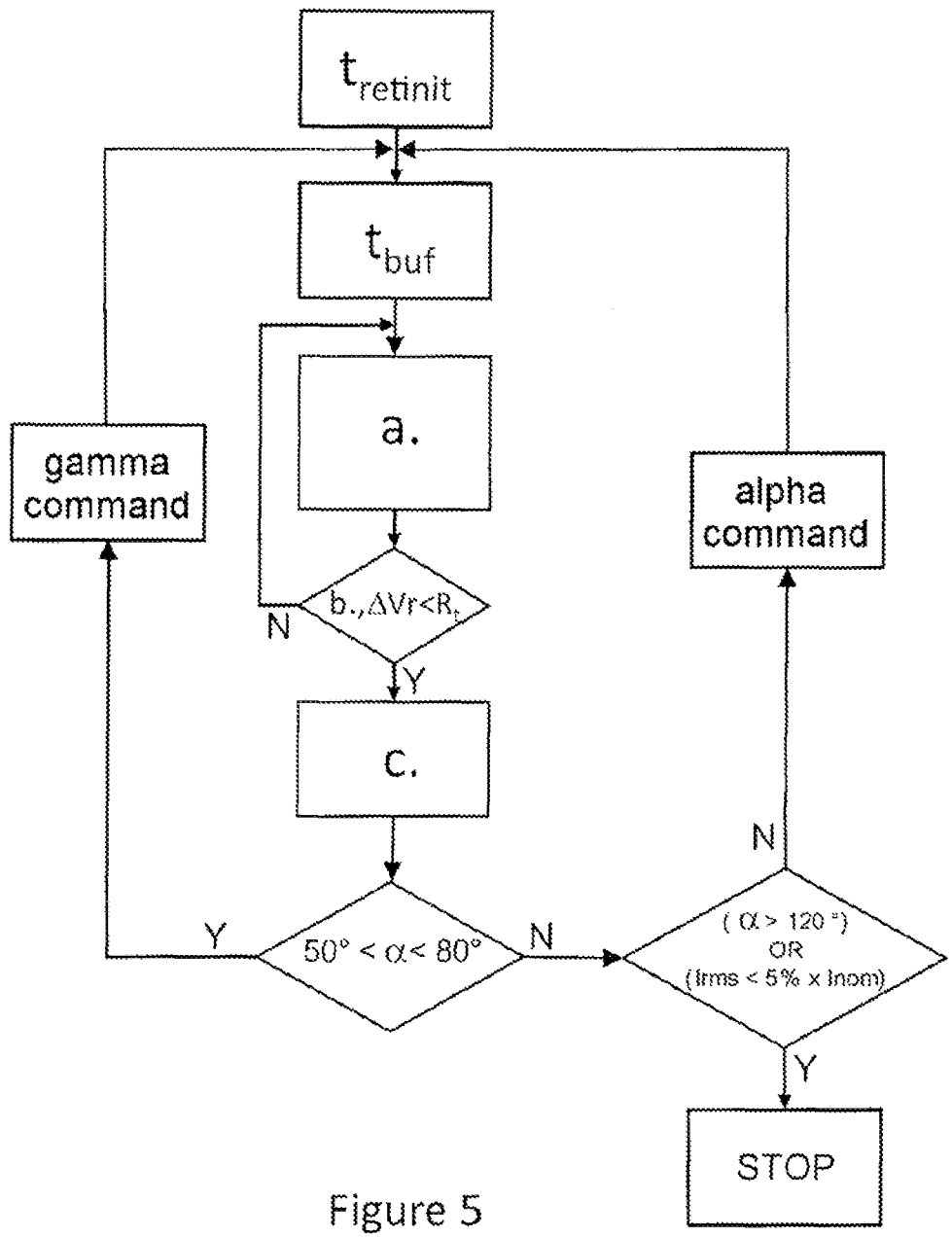
FIG. 5 is a flowchart illustrating the sequence of steps in the braking sequence according to the invention, wherein "y" indicates that the test is positive (yes), and "n" indicates that the test is negative (no)

The method comprises a braking sequence, the sequential steps of which are represented in the flowchart in FIG. 5.

The method can commence with a step for the initialization of the delay $t_{ret}$ at a value $t_{retinit}$, which is appropriate for the establishment of full-wave operation on the controlled switch.

Advantageously, $t_{retinit}$ is advantageously adjusted in order to trip the closing of the controlled switch 30a, 30b, 30c immediately upon the zero-crossing of the current. In other words, the closing command at time $t_\varphi$ is transmitted to the controlled switch 30a, 30b, 30c by the processing and control unit 35.

The braking sequence, at every n cycle of the alternating voltage $V_{AC}$, where "n" is a whole number other than zero, comprises the execution of the following steps:

a) determination of the value of a variation $\Delta Rr$ in the electrical resistance of the motor 10 during the preceding n cycles of the alternating voltage $V_{AC}$, b) comparison of the value of the variation $\Delta Rr$ in the electrical resistance of the motor 10, determined in step a), with a threshold resistance value $R_t$, c) increase in the delay $t_{ret}$ if the value of the variation $\Delta Rr$ in the resistance of the motor 10 is lower than the threshold resistance value, wherein the increase in the delay $t_{ret}$ is executed in accordance with a gamma command, the angle $\alpha$ falls within a given range of values, and in accordance with an alpha command in other cases.

More specifically, the given range of values lies above 30°, between 45° and 80°.

More specifically still, the given range of values lies between 50° and 80°.

Alternatively, the given range of values may lie between 45° and 75°.

Accordingly, the sequential increase in the delay $t_{ret}$ permits the progressive reduction of the supply current to the motor. The reduction in the supply current to the motor 10 permits a change of state to be induced on said motor 10.

By the term change of state, we understand a variation in the electrical resistance of the motor 10. It is understood that the increase in the delay $t_{ret}$ (and consequently the reduction of the supply current to the motor) generates a reduction in the electrical resistance of the motor 10.

Moreover, the increase in the delay $t_{ret}$ in accordance with the alpha command is preferred for angles $\alpha$ outside the angular range of 50°-80°. In practice, the alpha command, which is referenced in relation to the zero-crossing, is highly precise (in the light of the periodic nature of the zero-crossings of the voltage) in comparison with the gamma command, for which the time $t_\varphi$ can vary from one cycle to another. However, the Applicant has observed the presence of oscillations in the supply current to the motor 10. More specifically, the Applicant has observed that the amplitude of said oscillations is greater where the angle $\alpha$ lies between 50° and 80°. Accordingly, a given range of values within the interval of 50° and 80° may be preferred.

Oscillations in the supply current to the motor 10 are also observed when the increase in the delay $t_{ret}$ is executed in accordance with the gamma command. However, said oscillations are of smaller amplitude than those observed in conjunction with the alpha command.

Consequently, the selection criterion for one or the other of the alpha and gamma commands is based upon a compromise between the accuracy of the command for the increase in the delay $t_{ret}$ and a restriction of oscillations in the supply current to the motor 10.

Advantageously, step a) is a step for the determination of a relative temporal variation in the resistance of the motor $$\frac{\frac{\Delta R}{R}(t)}{\Delta t},$$

wherein said relative temporal variation is preferably calculated by the following equation:

$$\frac{\frac{\Delta R}{R}(t)}{\Delta t} = \frac{\frac{R(t-nT) - R(t)}{R(t-nT)}}{nT}$$

where R(t) is a value relative to the resistance of the motor determined at a time t, and T is the duration of one cycle of the alternating voltage $V_{AC}$.

According to an advantageous form of embodiment, the threshold resistance value $R_t$ may lie between 0.05 and 0.5, preferably between 0.1 and 0.3, and more preferably still between 0.15 and 0.25. For example, a threshold resistance value $R_t$ equal to 0.2 appears to be appropriate to the majority of applications.

Moreover, the increase in the delay $t_{ret}$ in step c) is executed by an increment $\Delta t$, such that the angle defined by the relationship $2\pi\Delta t/T$ is less than 5°, preferably less than 3°, and more preferably still lies between 0.5 and 2°.

According to the invention, it is possible to impose a waiting time $t_{buf}$ before repeating the braking sequence, once the delay $t_{ret}$ has been incrementally adjusted by the increment $\Delta t$. The waiting time $t_{buf}$ can preferably be a positive whole multiple p of the cycle time T of the alternating voltage $V_{AC}$, or more preferably p is equal to 2 (for example, for a supply voltage at 50 Hz, the waiting time may be equal to 40 ms).

Finally, the braking method according to the invention can comprise a STOP command step for the braking control method. In practice, when the supply current to the motor is lower than a predetermined current value and/or the firing angle α is greater than 120°, the motor no longer has sufficient inertia to continue to rotate independently (in other words, the supply current is low). Consequently, the current supply to the motor can be interrupted, and the braking method stopped. The predetermined current value can be, for example, a value lower than 5% of the rated current of the motor.

The braking control function for an asynchronous motor has been tested by simulation using a number of softwares (Matlab/Simulink and EMTP-ATP), and incorporating all the components of the system (power supply network, cables, the motor and its load).

The invention has also been simulated on a first test bench, comprising a 2-pole 2,500 kW motor operating at 60 Hz, and driving a centrifugal compressor. FIGS. 6a to 6c relate to a motor braking control function in accordance with an alpha command, which is actuated by a change of state of the motor (in other words, the delay $t_{ret}$ is only incrementally adjusted if the value of the variation ΔRr in the resistance of the motor 10 is lower than a threshold value).

FIGS. 7a to 7c relate to a motor braking control function by the braking method according to the invention.

FIGS. 6a to 6c represent the speed of rotation omega (plotted on the vertical axis) of the motor as a function of time (plotted on the horizontal axis) (FIG. 6.a), in response to the movement of the RMS current supplying the motor (FIG. 6.b), and in response to the movement of the angle α (FIG. 6.c). In general, the speed of the motor decreases as the angle α increases. In zone A (illustrated in FIG. 6b), an increase in the amplitude of oscillations in the RMS current is clearly observed. This effect is not foreseeable, and its occurrence may depend upon the mode of operation of the load which is supplied by the motor (it should be observed that, in this case, the load is a centrifugal compressor).

When the braking command according to the invention is applied to the same motor, the graphs represented in FIGS. 7a to 7c are obtained. FIG. 7.a illustrates the speed of rotation omega (plotted on the vertical axis) of the motor as a function of time (plotted on the horizontal axis), while FIG. 7.b represents the movement of the RMS current supplying the motor, and FIG. 7.c represents the movement of the angle α. Zones B and D relate to a control function in accordance with an alpha command, and zone C relates to a control function in accordance with a gamma command. A slight increase in the amplitude of current oscillations is clearly observed in zone B (control by alpha command), while said increase stabilizes (zone C) once the control function in accordance with a gamma command is executed. The transition from a control function in accordance with an alpha command to a control function in accordance with a gamma command permits the limitation of the increase in current oscillations during the motor braking phase. In the absence of this change in control function, the amplitude of current oscillations would increase more substantially (as illustrated in FIG. 6.b).

The invention has also been simulated on a second test bench, comprising a 6-pole 1,800 kW motor operating at 50 Hz, and driving a conveyor. FIGS. 8a to 8c relate to a motor braking control function in accordance with an alpha command, which is actuated by a change of state of the motor (in other words, the delay $t_{ret}$ is only incrementally adjusted if the value of the variation ΔRr in the resistance of the motor 10 is lower than the threshold value).

FIGS. 9a to 9c relate to a motor braking control function by the braking method according to the invention.

FIGS. 8a to 8c represent the speed of rotation omega (plotted on the vertical axis) of the motor as a function of time (plotted on the horizontal axis) (FIG. 8.a), in response to the movement of the RMS current supplying the motor (FIG. 8.b), and in response to the movement of the angle α (FIG. 8.c). In general, the speed of the motor decreases as the angle α increases. In zone A (illustrated in FIG. 8b), an increase in the amplitude of oscillations in the RMS current is clearly observed. This effect is not foreseeable, and its occurrence may depend upon the mode of operation of the load which is supplied by the motor (it should be observed that, in this case, the load is a conveyor).

When the braking command according to the invention is applied to the same motor, the graphs represented in FIGS. 9a to 9c are obtained. FIG. 9.a illustrates the speed of rotation omega (plotted on the vertical axis) of the motor as a function of time (plotted on the horizontal axis), while FIG. 9.b represents the movement of the RMS current supplying the motor, and FIG. 9.c represents the movement of the angle α. Zones B and D relate to a control function in accordance with an alpha command, and zone C relates to a control function in accordance with a gamma command. A slight increase in the amplitude of current oscillations is clearly observed in zone B (control by alpha command), while said increase stabilizes (zone C) once the control function in accordance with a gamma command is executed. The transition from a control function in accordance with an alpha command to a control function in accordance with a gamma command permits the limitation of the increase in current oscillations during the motor braking phase. In the absence of this change in control function, the amplitude of current oscillations would increase more substantially (as illustrated in FIG. 8.b).

These two examples of the deployment of the method according to the invention (illustrated in FIGS. 7.a to 7.c, and 9.a to 9.c), compared with a method for the control of braking by an alpha command only, demonstrate that it is possible, in a certain manner, to limit the amplitude of the RMS current flowing in the motor.

The invention also relates to a computer program product comprising program code instructions for the execution, where said program is run on a computer, of steps for the determination of a variation in a resistance of the motor, the comparison of said variation with a threshold resistance value $R_t$, the selection of a command for the increase of the delay $t_{ret}$, selected from one or the other of the alpha and gamma commands in accordance with a selection criterion, and an increase in the delay $t_{ret}$ if the value of the variation in the resistance of the motor is lower than a threshold value.

By the term computer, we understand any electronic device which is capable of executing the various instructions of the program code; more specifically, the electronic device may comprise a processor, an electronic control board, or a computer.

According to one form of embodiment, the selection criterion involves the choice of a gamma command when the angle α lies between 50° and 80°.

REFERENCES

[1] WO 01/89073 A2;
[2] FR 3 020 525

The invention claimed is:

1. A control method for braking an electric motor which is connected to an alternating voltage source $V_{AC}$ having a cycle period T, wherein the method involves, in each cycle of the alternating voltage $V_{AC}$, the supply of current to the motor, by the firing of a controlled switch, with a delay $t_{ret}$, at a firing angle a, wherein said angle a is measured in relation to the zero-crossing of the alternating voltage $V_{AC}$, and wherein the method comprises a braking sequence wherein, for every n cycle of the alternating voltage $V_{AC}$, the following steps are executed:
   a) determining the value of a variation DRr in the electrical resistance of the motor during the preceding n cycles of the alternating voltage $V_{AC}$,
   b) comparing the value of the variation DRr in the electrical resistance of the motor determined in step a), with a threshold resistance value $R_t$, and
   c) increasing the delay $t_{ret}$ if the value of the variation DRr in the resistance of the motor is lower than the threshold resistance value $R_t$, wherein the increase of the delay $t_{ret}$ is executed in accordance with a gamma command, where the angle a falls within a given range of values, and in accordance with an alpha command for angles outside the given range of values,
wherein step a) is a step for the determination of a relative temporal variation in the resistance of the motor $$\frac{\frac{\Delta R}{R}(t)}{\Delta t},$$

wherein said relative temporal variation is calculated by the following equation:

$$\frac{\frac{\Delta R}{R}(t)}{\Delta t} = \frac{\frac{R(t-nT)-R(t)}{R(t-nT)}}{nT}$$

where R(t) is a value relative to the resistance of the motor determined at a time t.

2. The method according to claim 1, wherein the given range of values lies over 30°.

3. The method according to claim 1, wherein the given range of values lies between 50° and 80°.

4. The method according to claim 1 or 2, wherein the given range of values lies between 45° and 75°.

5. The method according to claim 1, wherein the method commences with a step for the initialization of the delay $t_{ret}$ at a value $t_{retinit}$, which is appropriate for the establishment of full-wave operation on the controlled switch, wherein $t_{retinit}$ is advantageously adjusted in order to trip the closing of the controlled switch immediately upon the zero-crossing of a current flowing in the controlled switch.

6. The method according to claim 1, wherein, in step c), the increase in the delay $t_{ret}$ is executed by an increment Dt, such that the angle defined by the relationship 2pDt/T is less than 5°.

7. The method according to claim 1, wherein, once the delay $t_{ret}$ is increased in step c), a waiting time $t_{buf}$ is imposed prior to the repetition of the braking sequence, wherein the waiting time $t_{buf}$ is a whole multiple p of the cycle time T of the alternating voltage $V_{AC}$.

8. The method according to claim 1, wherein, once the firing angle a exceeds 120° and/or the current flowing in the motor is lower than a predefined current value, the control method for braking the motor is terminated and, advantageously, the controlled switch is open.

9. The method according to claim 1, wherein the threshold resistance value $R_t$ lies between 0.05 and 0.5.

10. The method according to claim 1, wherein the controlled switch comprises at least two thyristors, connected head-to-tail in parallel.

11. A non-transitory computer-readable medium encoded with computer readable instructions that, when executed by a computer, cause the computer to perform a method comprising:
   determining a variation in a resistance of the motor,
   comparing said variation with a threshold resistance value $R_t$,
   selecting a command for the increase of the delay $t_{ret}$, selected from one or the other of the alpha and gamma commands in accordance with a selection criterion, and
   increasing the delay $t_{ret}$ if the value of the variation in the resistance of the motor is lower than a threshold value according to claim 1.

12. The non-transitory computer-readable medium according to claim 11, wherein the selection criterion involves the choice of a gamma command when the angle a lies between 50° and 80°.

13. The method according to claim 1, wherein the given range of values lies between 45° and 80°.

14. The method according to claim 1, wherein, in step c), the increase in the delay $t_{ret}$ is executed by an increment Dt, such that the angle defined by the relationship 2pDt/T is less than 3°.

15. The method according to claim 1, wherein, in step c), the increase in the delay $t_{ret}$ is executed by an increment Dt, such that the angle defined by the relationship 2pDt/T is between 0.5 and 2°.

16. The method according to claim 1, wherein, once the delay $t_{ret}$ is increased in step c), a waiting time $t_{buf}$ is imposed prior to the repetition of the braking sequence, wherein the waiting time $t_{buf}$ is a whole multiple p of the cycle time T of the alternating voltage $V_{AC}$, and p is equal to 2.

17. The method according to claim 1, wherein the threshold resistance value $R_t$ lies between 0.1 and 0.3.

18. The method according to claim 1, wherein the threshold resistance value $R_t$ lies between 0.15 and 0.25.

* * * * *